United States Patent [19]

Ruof

[11] 4,243,940
[45] Jan. 6, 1981

[54] AC TO DC CONVERTER FOR ANTISKID SYSTEMS

[75] Inventor: Edgar J. Ruof, Akron, Ohio

[73] Assignee: Goodyear Aerospace Corporation, Akron, Ohio

[21] Appl. No.: 967,193

[22] Filed: Dec. 7, 1978

[51] Int. Cl.³ .......................... H03K 9/06; H03L 7/00
[52] U.S. Cl. ...................................... 328/140; 328/26; 328/55; 303/93; 307/233 B; 307/264
[58] Field of Search .............. 307/233 B, 264; 328/26, 328/55, 140; 303/93

[56] References Cited

U.S. PATENT DOCUMENTS

| 3,566,159 | 2/1971 | Plunkett | 328/26 X |
|---|---|---|---|
| 3,702,407 | 11/1972 | Sharp | 307/233 B |
| 3,770,327 | 11/1973 | Ruof | 307/233 B |
| 3,782,784 | 1/1974 | Marouby | 328/140 X |
| 4,166,248 | 8/1979 | Bianchi et al. | 328/140 |

Primary Examiner—John S. Heyman
Attorney, Agent, or Firm—P. E. Milliken; E. W. Oldham; R. L. Weber

[57] ABSTRACT

A circuit for converting AC signals from a wheel speed transducer to a varying DC level indicative of the instantaneous rotational speed of the wheel of a vehicle. The invention includes a squaring circuit receiving a sinusoidal input from a wheel speed transducer and producing a fixed amplitude square wave of a frequency equivalent to that of the sinusoidal input. A pulsing circuit receives the square wave signal and produces a series of fixed duration pulses of a frequency double that of the sinusoidal signal. These pulses are applied to an integrator which produces a DC output of an amplitude characteristic of the frequency of the sinusoidal input. The integrator has a characteristic phase lag associated therewith resulting in a tendency of the phase of the superimposed AC output, caused by cyclic changes in the frequency of the transducer output, to lag the phase of the associated wheel speed change. A lead network is designed into the integrator to compensate for such phase lag and to cause the instantaneous amplitude of the DC output to more closely correlate with the associated change in wheel speed.

11 Claims, 1 Drawing Figure

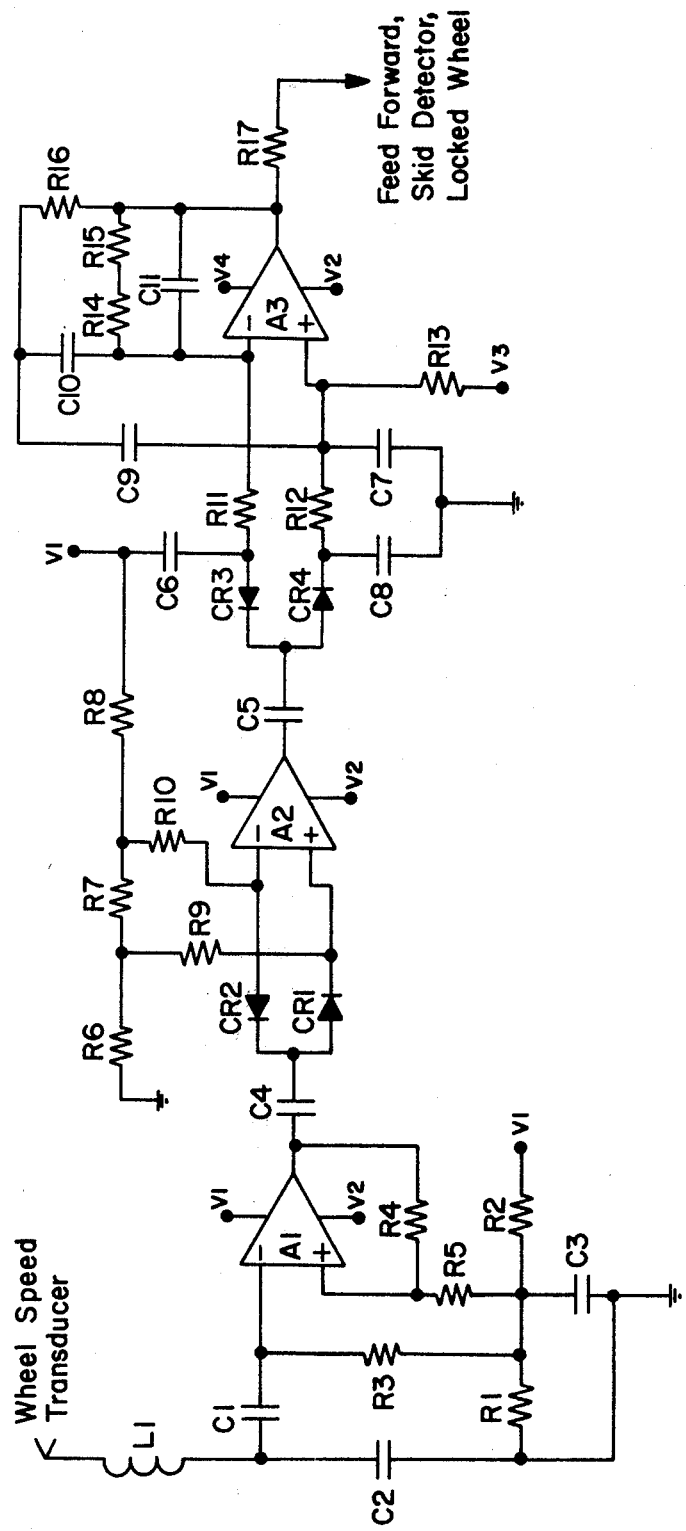

AC TO DC CONVERTER FOR ANTISKID SYSTEMS

BACKGROUND OF THE INVENTION

The instant invention resides in the art of antiskid systems and particularly those for aircraft. More specifically, the invention is an AC to DC converter for changing the AC output signal of a wheel speed transducer to a varying DC level indicative of the instantaneous rotational speed of the associated wheel of an aircraft or other vehicle.

It has been previously known in the art to provide a wheel speed transducer or generator with each of the braked wheels of an aircraft to produce an AC signal corresponding to the associated wheel's rotational speed. Most generally, this AC signal is converted to a DC level having an amplitude which varies with the rotational speed of the wheel and, correspondingly, the frequency of the AC signal. This varying DC output is applied to skid detection, locked wheel, feed forward, and other similar control circuitry of an antiskid system to modulate or otherwise control the application and/or release of brake pressure, particularly when the output of the wheel speed transducer is indicative of skidding activity.

Inherent in the prior art of AC to DC converters for use with an antiskid system is a phase lag existing between the DC level and the AC signal responsible for generating that level. Cyclic changes in the frequency of the transducer output are indicative of cyclic changes of wheel speed, such as might occur from fore and aft oscillation of the landing gear of an aircraft. These changes create corresponding changes in the amplitude of the DC output of the converter which appears as a relatively low frequency AC voltage superimposed on the DC output. Prior art converters tend to lag the phase of the superimposed AC output with respect to the associated change in wheel speed. Generally, this phase lag is due to the capacitive means utilized by the converter for either storing charge, reducing ripple, or otherwise acquiring a satisfactory and steady DC signal. Other phase lags are generally present in antiskid systems such as those which occur from the electrohydraulic servo valve in the development of brake pressure by an electrical signal. In modern aircraft particularly, wherein landing gears are of short length and low mass, the accumulated phase lags have become substantial. Hence, two principal sources of phase lag are present in most antiskid systems: that from the inherent phase lag of the AC to DC converter, and that from the servo valve.

It has been known in the art to use a feed forward circuit to compensate for the above-mentioned phase lags. To be efficient, such feed forward circuit must be designed to compensate for both the inherent phase shift of the converter and the characteristic phase shift of the servo valve. Such a design is not particularly simple since the frequency characteristics of the two phase lags may be substantially different. In order that the feed forward circuit may be designed around the particular characteristics of the servo valve of the associated aircraft, it is most desirable that the phase lag resulting from the converter itself be treated separately and apart from the feed forward circuit, most preferably in the converter itself.

OBJECTS OF THE INVENTION

In light of the foregoing, it is an object of the instant invention to provide an AC to DC converter for an antiskid system which includes means for compensating for the inherent phase lags generated within the converter itself.

Another object of the invention is to provide an AC to DC converter for an antiskid system which provides a DC signal responding more rapidly to changes in the frequency of the AC input signal than converters previously known in the art.

Still another object of the invention is to provide an AC to DC converter for an antiskid system which provides a substantially ripple-free varying DC signal indicative of instantaneous wheel speed. Yet an additional object of the invention is to provide an AC to DC converter for an antiskid system which is accurate and reliable in operation, relatively simplistic in construction, and conductive to implementation with state-of-the-art elements.

SUMMARY OF THE INVENTION

The foregoing and other objects of the invention which will become apparent as the detailed description proceeds are achieved by the improvement of an AC to DC converter in an antiskid system, comprising: a squaring circuit receiving a sinusoidal input and producing a corresponding square wave output; a pulsing circuit connected to said squaring circuit and producing pulses of a frequency determined by the frequency of said square wave output; first circuit means connected to said pulsing circuit for converting said pulses to a DC output having an amplitude corresponding to the frequency of said pulses, said first circuit means tending to create a phase lag between variations in amplitude of said DC output signal and changes in frequency of said sinusoidal signal; and second circuit means, comprising a portion of said first circuit means, for compensating for said phase lag.

DESCRIPTION OF DRAWING

For a complete understanding of the objects, techniques, and structure of the invention, reference should be had to the following detailed description and accompanying drawing wherein there is shown a schematic diagram of the AC to DC converter of the invention, showing the same interconnected between a wheel speed transducer and antiskid control circuitry of an associated aircraft.

DETAILED DESCRIPTION OF PREFERRED EMBODIMENT

Referring now to the drawing, it can be seen that the AC to DC converter of the invention is operative for interconnection between the wheel speed transducer of the braked wheel of an aircraft or other vehicle, and antiskid circuitry for that vehicle such as a feed forward circuit, a skid detector, locked wheel circuitry, or the like. The input to the converter supplied by the transducer is the sinusoidal signal having a varying frequency indicative of the instantaneous rotational speed of the associated wheel. This sinusoidal signal is applied first to a filter, comprising the inductor L1 and capacitor C2, which provides a low impedance path to ground for high frequency noise carried along with the input. The capacitor C1 operates as a coupling capacitor for carrying the AC signal of the transducer to the negative input of the amplifier A1. This input is biased through R3 by the voltage divider of R1,R2 connected between V1 and ground. Preferably, R1 and R2 are of such value that the negative input is biased at a point midway between V2 and V1. The positive input of the amplifier A1 is characterized by a hysteresis loop provided by the positive feedback via resistor R4 which, through the resistor R5, is also maintained at the bias level established by the voltage divider R1,R2. This hysteresis loop causes the positive input of the amplifier A1 to be either slightly lower or slightly higher than the DC voltage of the negative input, depending on whether the output of the amplifier is at a high or low level. The hysteresis prevents operation of the converter by low level signals which occur at very low wheel speeds and, correspondingly, reduces susceptibility of the converter to noise. The capacitor C3 is connected at the junction point of the voltage divider R1,R2 to provide a noise filter for the hysteresis feedback loop of resistor R4, thus isolating the hysteresis loop of the positive input from the voltage bias on the negative input, while allowing both inputs to be supplied from the same voltage divider.

The output of the amplifier A1 is a square wave of fixed amplitude, slightly less than the supply voltage V1 minus V2, and of a frequency corresponding to that of the sinusoidal input. This square wave output is coupled across the capacitor C4 to the positive and negative inputs of the amplifier A2 via respective diodes CR1 and CR2. In the absence of an input signal to the amplifier A2, the output thereof is at V2 potential since the voltage divider R6,R7,R8, interconnected between V1 and ground, is scaled such that the negative input of the amplifier A2 is at a slightly higher potential than the positive input. When the output of amplifier A1 goes positive in the square wave cycle, the time constant of C4 and R9 via CR1 holds the positive input at a higher voltage than the negative input for a time period of approximately 100 microseconds. Similarly, when the square wave is in its negative going half-cycle, the time constant of C4 and R10 via diode CR2 holds the negative input at a lower voltage than the positive input for a period of about 100 microseconds. Thus, the output of the amplifier A2 is a series of pulses, each of a duration of approximately 100 microseconds, occurring on each transition of the square wave output of the amplifier A1. Consequently, there are two such pulses provided per cycle of the transducer input signal, and the signal frequency is accordingly doubled. It will be understood that the 100 microsecond pulse duration is determined by the time constants of resistors R9 and R10 when combined with the capacitor C4 and, by appropriately selecting such resistor and capacitor values, any suitable pulse duration can be achieved. In any event, the output of amplifier A2 is a series or train of pulses having a frequency corresponding to instantaneous wheel speed and double the frequency of the associated sinusoidal signal.

The final stage of the converter is an integrator circuit for receiving the pulses from A2 and integrating such pulses to produce a DC output signal of an amplitude corresponding to the frequency of the pulses. Each output pulse from the amplifier A2 effects a transfer of charge from capacitor C5 to capacitor C7. Between pulses, part of the charge on the capacitor C7 is drained away through the resistor R13 to the voltage source V3. The charge on capacitor C7 represents the positive input to the integration amplifier A3. The negative going transition of the output pulses of amplifier A2 tends to draw current from capacitor C6 and resistor R11, thus affecting the negative input of the amplifier A3. Diodes CR3 and CR4 act as isolation diodes allowing only positive excursions of the pulses of amplifier A2 to affect the positive input of the amplifier A3, and similarly allowing only negative excursions to affect the negative input thereof.

The amplifier A3 acts as a diode-pump integrator, having a capacitor C11 for noise reduction in the feedback network in parallel with resistors R14,R15 provided for DC gain. Preferably, resistor R15 is a calibration and compensation resistor selected with consideration to the tolerances in values of other circuit components. As shown, the output of the integration amplifier A3 is a DC level varying in amplitude in accordance with the frequency of the signal from amplifier A2 and, correspondingly, with the rotational speed of the vehicle wheel.

It is most desirable that at any point in time the amplitude of the DC output of amplifier A3 correspond with the frequency of rotation of the associated wheel at that same time. However, a phase lag between changes in frequency of the sinusoidal input signal and changes in the amplitude of the DC output signal occurs due to inherent time lags within the converter itself. Particularly, the time constants associated with the charging and discharging circuits of C7,R12 and C6,R11 account, in part, for such phase lag. To compensate for such phase lag, a lead network is provided. Of most importance, the lead network comprises resistor R16 and capacitor C9 connected in a positive feedback mode. This positive feedback functions as a lead network, allowing the integration amplifier A3 to respond more promptly to changes in the DC level. The prompt response of the integrator A3 compensates for the lag experienced in the charging and discharging of capacitors C7,C6, and brings the output DC level into a closer time phase relationship with wheel activity.

It has been found in operation that a capacitive feedback loop to the negative input of the amplifier A3, comprising resistor R16 and capacitor C10, may be provided for purposes of subduing or reducing ripple in the DC output signal. Otherwise, the capacitor C10 plays little part in the lead network. It should also be noted that the size of the resistor R16 is relatively unimportant, but that the capacitor C9 must be selected with due consideration given to the operating frequency range of the converter circuit. Additionally, and in order to further provide a relatively ripple-free DC output signal, capacitor C8 may be interposed between resistor R12 and ground to function as a filter to minimize ripple that may occur via the feedback to the positive input of the amplifier A3 while the resistor R11 and capacitor C6 function as a ripple filter for the negative input thereof.

There has thus been presented a relatively ripple-free AC to DC converter circuit wherein the output DC signal is in substantial time synchronization with the input signal. The primary phase lag problem now remaining is that due to the servo valve and hydraulic brake characteristics of the particular aircraft or vehicle. A feed forward circuit may be readily developed to compensate for such phase lag with the output signal of the converter being fed directly to the feed forward circuit. Similarly, this output may be provided to a skid detector, locked wheel detection and arming circuitry, and the like.

The circuit values of the elements set forth above and illustrated in the drawing should be readily determinable by one skilled in the art. In a preferred embodiment of the invention, the voltage sources would have the following values: V1=15 volts; V2=0 volts; V3=4 volts; and V4=28 volts.

Thus, it can be seen that the objects of the invention have been satisfied by the structure presented hereinabove. While in accordance with the patent statutes, only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. In an antiskid system having a wheel speed transducer producing a sinusoidal signal, the improvement of an AC to DC converter, comprising:
   a squaring circuit receiving the sinusoidal signal and producing a corresponding square wave output;
   a pulsing circuit connected to said squaring circuit and producing pulses of a frequency determined by the frequency of said square wave output;
   an integrator having first and second inputs, each connected to said pulsing circuit through a uniquely associated resistor and capacitor, said integrator converting said pulses to a DC output having an amplitude corresponding to the frequency of said pulses, said integrator tending to create a phase lag between variations in amplitude of said DC output signal and changes in frequency of the sinusoidal signal; and
   a capacitor connected in a positive feedback loop across said integrator for compensating for said phase lag.

2. The improvement in an AC to DC converter according to claim 1 wherein said pulsing circuit is a frequency doubler, said pulses being of a frequency twice that of the sinusoidal input.

3. The improvement in an AC to DC converter according to claim 1 wherein said resistor and capacitor connected to said first input comprise a charging circuit and said resistor and capacitor connected to said second input comprise a discharging circuit.

4. The improvement in an AC to DC converter according to claim 1 wherein said first input and second input are respectively positive and negative inputs to said integrator.

5. The improvement in an AC to DC converter according to claim 1 wherein said integrator includes filter means connected to said first and second inputs thereof for filtering ripple from said DC output.

6. The improvement in an AC to DC converter according to claim 1 wherein said squaring circuit includes an amplifier having a hysteresis feedback loop connected to the positive input thereof.

7. The improvement in an AC to DC converter according to claim 6 wherein said amplifier has a negative input biased by a voltage divider, said hysteresis feedback loop being connected to said voltage divider, and wherein a filter capacitor is connected to said voltage divider to decouple said negative input from said hysteresis loop.

8. An AC to DC converter for an antiskid system, comprising:
   first circuit means for receiving a sinusoidal signal and converting said sinusoidal signal into a pulsating signal;
   an integrator having positive and negative inputs connected to said first circuit means, receiving said pulsating signal and producing a DC signal of an amplitude corresponding to the frequency of said pulsating signal, said integrator tending to introduce a phase lag between amplitude changes in said DC signal and frequency changes in said sinusoidal signal;
   a positive feedback circuit comprising a capacitor connected across said integrator, functioning as a lead network, bringing the phase of said DC signal and said sinusoidal signal into substantial synchronization; and
   a charging resistive and capacitive circuit interconnected between said positive input and said first circuit means and a discharging resistive and capacitive circuit interconnected between said negative input and said first circuit means.

9. The AC to DC converter as recited in claim 8 wherein said integrator comprises an amplifier.

10. The AC to DC converter as recited in claim 9 wherein said amplifier further includes filter means connected to each input thereof for reducing ripple in said DC signal.

11. The AC to DC converter as recited in claim 9 wherein said integrator further includes a second capacitor interconnected between the output of said amplifier and the negative input thereof.

* * * * *